No. 832,306. PATENTED OCT. 2, 1906.
G. P. FINNIGAN.
PNEUMATIC BRAKE VALVE.
APPLICATION FILED AUG. 26, 1904.
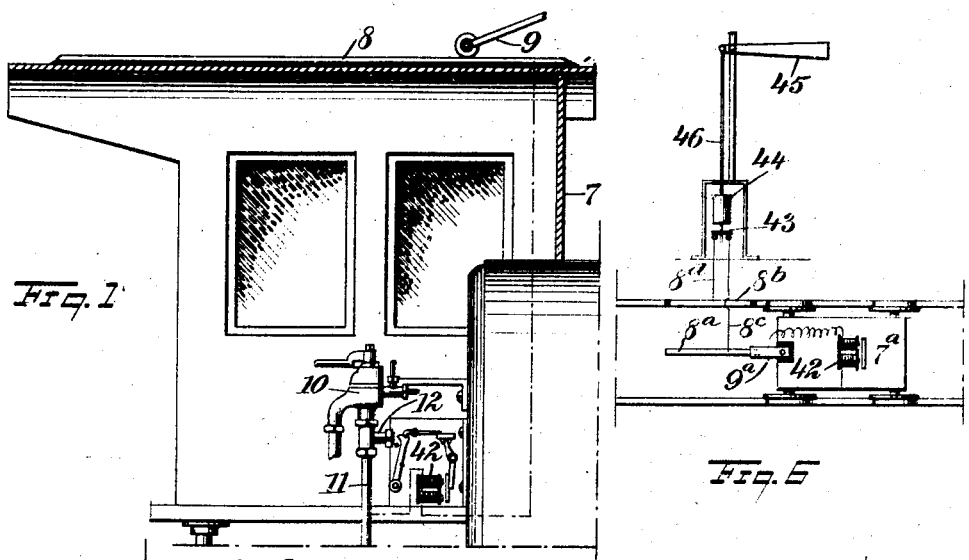
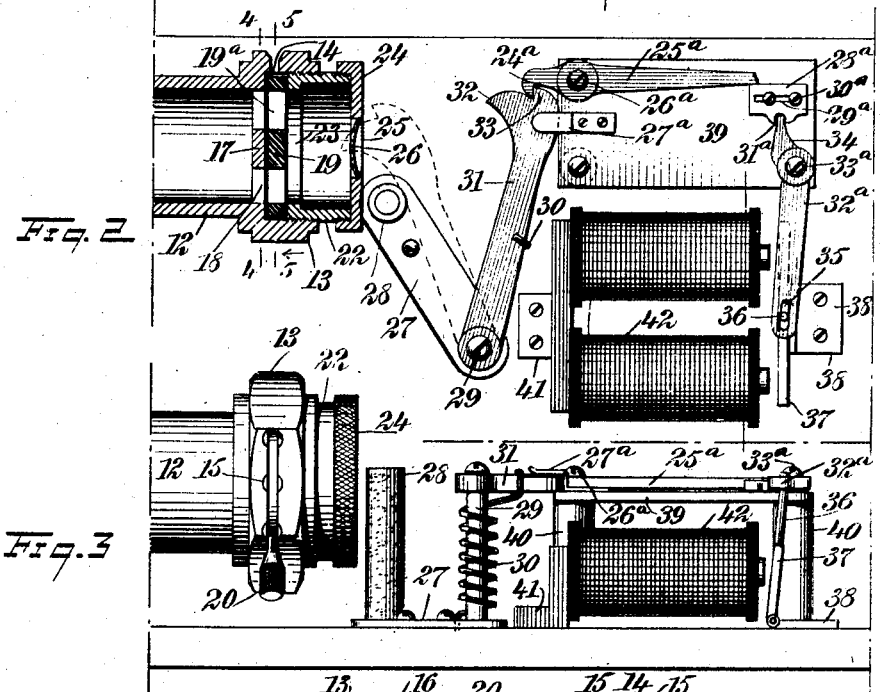
WITNESSES:
INVENTOR
George P. Finnigan
BY
ATTORNEYS

UNITED STATES PATENT OFFICE.

GEORGE P. FINNIGAN, OF GREENE, NEW YORK.

PNEUMATIC BRAKE-VALVE.

No. 832,306.  Specification of Letters Patent.  Patented Oct. 2, 1906.

Application filed August 26, 1904. Serial No. 222,240.

*To all whom it may concern:*

Be it known that I, GEORGE P. FINNIGAN, a citizen of the United States, and a resident of Greene, in the county of Chenango and State of New York, have invented a new and Improved Pneumatic Brake-Valve, of which the following is a full, clear, and exact description.

My invention relates to pneumatic valves and admits of general use, my more particular object being to produce a special type of valve which is adjustable and which is of peculiar advantage when used upon pneumatic brakes of various kinds.

Among the advantages presented by my valve is the fact that it is useful in cases of emergency where it is desirable to suddenly open a valve to a predetermined extent—as, for instance, where the valve is employed for the purpose of releasing air from a train-pipe, thus applying the brakes and stopping the train.

The valve is provided with an adjustment, so that when the valve is fully opened the volume of air passing through it is controlled entirely by the adjustment.

Reference is to be had to the accompanying drawings, forming a part of this specification, in which similar characters of reference indicate corresponding parts in all the figures.

Figure 1 is a vertical fragmentary section through a locomotive equipped with my invention. Fig. 2 is a side elevation of the device, showing the valve proper in vertical section. Fig. 3 is a plan view of the valve and its immediate connections. Fig. 4 is a vertical section upon the line 4 4 of Fig. 2 looking toward the left of the drawings. Fig. 5 is a section upon the line 5 5 of Fig. 2 looking in the direction of the arrow; and Fig. 6 is a plan, partly diagrammatic, showing a trolley connection different from that shown in Fig. 1 for energizing the valve.

Upon the cab 7 is mounted a conductor 8, engaged by a trolley 9, whereby the electric connections are completed. The pneumatic valve controllable by the engineer is shown at 10 and is provided with the usual tube 11 to be connected with the train-pipe. Connected with this valve 10 is a T 12, provided with an annular portion 13, integral therewith, this annular portion being provided with a slot 14, having countersinks 15 of substantially conical form merged thereinto, as indicated in Figs. 3 and 5. The T 12 is provided with a web 17, this web having sector-like apertures 16, as indicated in Figs. 2 and 4. A revoluble valve member 19 is provided with similar apertures 17, as indicated in Fig. 5. A manually-operated screw 20 is provided with a stem 21, integral therewith, this stem being free to screw into the revoluble member 19, as indicated in Fig. 5. The screw 20 may be loosened and the revoluble member 19 turned relatively to the web 17, the screw being then tightened. The screw engages some one of the countersinks 15 for the purpose of holding the revoluble member 19 rigidly in position. The stem 21 of the screw fits neatly into the slot 14, so as not to interfere with this relative movement except when the screw is tightened into one or the other of the countersinks mentioned. By adjusting the revoluble member 19 relatively to the web 13 the sector-like apertures 16 17 may be brought into such positions as to partly register with each other, as indicated in Fig. 5, thus adjusting the capacity of the valve for permitting the passage of air. An annulus 22 is provided, as shown in Fig. 2, and is provided internally with an annular rib 23, which prevents the revoluble member 19 from being misplaced. Mounted upon this annulus 22 is a cap 24, provided with a central aperture 25, closed by a glass disk 26. This disk may be cemented within the cap 24 or otherwise secured in any desirable manner.

Upon an immovable plate 27 is mounted a post 28, of insulating material, and also a post 29, preferably of metal. This last-mentioned post is encircled by a spring-wire 30, coiled into the form of a spiral and engaging a hammer 31, pivotally mounted upon the post. The spring is under tension and normally tends to drive the hammer in the direction indicated by dotted lines in Fig. 2. The hammer 31 is provided with a striking-point 32 and with a shoulder 33, whereby it may be held temporarily in a retracted position. A lever 25ª is pivoted at 26ª and is provided with a dog 24ª integral therewith for engaging the shoulder 33. A guide 27ª prevents the hammer 31 from getting out of alinement with the dog 24ª. A sliding plate 28ª is provided with a slot 29ª, loosely engaging screws 30ª, whereby said plate is free to move to the right or to the left relatively to these screws. The plate 28ª is provided for the purpose of holding the lever 25ª in such position that the dog 24ª will hold the hammer 31 in its retracted position and yet will cause the hammer to be released when the plate 28ª is moved to the right, as will be seen from Fig. 2. The sliding plate 28ª is provided with a notch 31ª, engaged by a pawl 34, integrally connected with a lever 32ª, this lever being mounted upon a pivot 33ª. The lever 32ª is provided with a slot 35, which loosely engages a pin 36, carried by an armature 37, pivotally mounted upon a plate 38. When the armature 37 swings to the right or to the left, as seen in Fig. 3, the lever 32ª is caused to rock correspondingly and to move the plate 28ª. The levers 25ª and 32ª, plate 28ª, and guide 27ª are all mounted upon a stationary plate 39, which is mounted upon a post 40. Mounted upon a bracket 41 is an electromagnet 42, adapted to attract the armature 37. In Fig. 1 the magnet 42 is energized by means of the trolley 9, which may of course be operated in any desired manner, preferably by movements of the train relatively to the trolley.

In Fig. 6 the rail-sections 8ª 8ᵇ are connected, respectively, with the wires 8ᶜ 8ᵈ, which are in turn connected with the contact 43, this contact being opened and closed automatically by a solenoid 44, provided with a signal-arm 45 and rod 46. When the semaphore-arm 45 is in a position indicating danger, as shown in Fig. 6, the contact 43 is closed. If now a vehicle 7ª, provided with a trolley 9ª, passes along the track adjacent to the semaphore-arm 45, the wheels of the vehicle 7ª and the trolley 9ª complete a circuit through the magnet 42, thereby energizing the apparatus. It will be understood, however, that my present invention relates merely to the pneumatic valve and immediate electric connections for energizing the same, and I do not limit myself to any particular means for energizing the magnet 42.

My invention is used as follows: The hammer 31 is drawn backward into the position indicated by full lines in Fig. 2 and secured in position by the dog 24ª. The sliding plate 28ª is now slipped a little to the left, so as to engage the free end of the lever 25ª. This movement of the plate 28ª causes the lower or free end of the lever 32ª to swing to the right, thus carrying the armature 37 a little distance away from the magnet 42. If now the magnet 42 be energized by the completion of the circuit through the same—as, for instance, when the vehicle arrives in such position that the trolley 9 engages the conductor 8 or the trolley 9ª engages the rail-section 8ª, so that a circuit is completed through the wheels of the vehicle, as will be done when the vehicle 7ª moves to the left from its position indicated in Fig. 6, the magnet 42 is instantly energized. This causes the armature 37 to swing toward the magnet, carrying with it the lever 32ª and moving the sliding plate 28ª a little to the right, so as to release the dog 24ª from the hammer 31. The hammer thereupon thrown by the spring 30 into the position indicated by dotted lines in Fig. 2 breaks the glass 26 and allows the air to pass out suddenly from the T 12, thereby venting the train-pipe and automatically applying the air-brakes to the train. By the adjustment hereinbefore described the revoluble member 19 may be so turned as to regulate the quantity of air passing out from the train-pipe, so that while the air is suddenly released by the breaking of the glass 26 the rate at which the air makes its escape is necessarily governed by the position of the revoluble member 19. This adjustment is of peculiar value in cases where it may be feared that a sudden application of the emergency-brake may work mischief with some of the parts.

I do not limit myself to the application of my pneumatic valve to air-brakes. It may obviously be used in any other relation wherein it is desirable to suddenly allow a fluid to escape through a passage of predetermined size. It is of peculiar service upon railroads, however, for the reason that it acts so quickly as to apply the brakes in time to prevent disaster.

Having thus described my invention, I claim as new and desire to secure by Letters Patent—

1. In a pneumatic brake-valve, the combination of a hollow pneumatic member provided with an opening, a disk of glass disposed adjacent to said opening and having a convex conformity for the purpose of resisting air-pressure, and means for automatically breaking said disk so as to allow the free passage of air through said opening.

2. In a pneumatic brake-valve, the combination of a hollow pneumatic member provided with a web and with apertures disposed within said web, a revoluble member provided with apertures and movable relatively to said web so as to cause said apertures to partially register with each other, a cap connected with said pneumatic member and provided with an opening, a glass closure member engaging said cap and normally obstructing the passage of air through said apertures, and means for breaking said glass member.

3. In a pneumatic brake-valve, the combination of a pneumatic member provided with a brittle substance normally obstructing the passage of air, a hammer for breaking said brittle substance, thereby allowing the escape of air, lever mechanism for normally holding said hammer in a retracted position, and electric mechanism for automatically operating said lever mechanism so as to release said hammer.

4. In a pneumatic brake-valve, the combination of a pneumatic member provided with an opening, a glass disk disposed adjacent to said opening and normally closing the same, a hammer for breaking said glass disk, a spring connected with said hammer for forcing the same toward said disk, a lever provided with a dog for holding said hammer in a retracted position, a slide engaging said lever for the purpose of temporarily holding the same in position to engage said hammer, a lever engaging said slide and free to move the same, an armature connected with said lever, an electromagnet connected with said armature, and means controllable automatically by movements of a vehicle, for energizing said electromagnet.

5. In a pneumatic brake-valve, the combination of a movable member for suddenly venting the train-pipe, a lever temporarily engaging said movable member, a slide for holding said lever in a predetermined position, and mechanism controllable by an electromagnet for actuating said slide so as to release said lever.

6. In a pneumatic brake-valve, the combination of a pneumatic member provided with an aperture to be vented for the purpose of supplying air-brakes, a fragile disk normally closing said aperture, a hammer for breaking said disk, mechanical means for restraining said hammer and electrically-operated mechanism for releasing said restraining means.

7. In a pneumatic brake-valve, the combination of a pneumatic member provided with an aperture to be vented for the purpose of applying air-brakes, said aperture being normally closed, means controllable at will for adjusting the capacity of said aperture, and mechanism for suddenly opening said aperture to the full extent allowed for when thus adjusted, said mechanism being independent of said adjusting means.

8. In a pneumatic brake-valve, the combination of a pneumatic member to be vented for the purpose of applying air-brakes, said pneumatic member being normally closed, means for opening said pneumatic member, and mechanism for controlling the facility with which said pneumatic member is vented, said mechanism being independent of said means for opening said pneumatic member.

9. In a pneumatic brake-valve, the combination of a pneumatic member to be vented for the purpose of applying air-brakes, electrically-operated magnetic mechanism for venting said pneumatic member, and mechanism controllable at will for adjusting the facility with which said pneumatic member is thus vented, said mechanism being independent of said means for venting said member.

10. In a pneumatic brake-valve, the combination of a pneumatic member to be vented for the purpose of applying air-brakes, means for venting said pneumatic member, and mechanism adjustable by hand for controlling the facility with which said pneumatic member is vented, said mechanism being independent of said means for venting said member.

11. In a pneumatic brake-valve, the combination of a pneumatic member located upon a vehicle, means controllable by movements of said vehicle for venting said pneumatic member, and mechanism adjustable by hand for controlling the facility with which said pneumatic member is vented, said mechanism being independent of said means for venting said pneumatic member.

In testimony whereof I have signed my name to this specification in the presence of two subscribing witnesses.

GEORGE P. FINNIGAN.

Witnesses:
WALTON HARRISON,
JNO. M. RITTER.